United States Patent
McDonnell et al.

(10) Patent No.: US 6,925,288 B2
(45) Date of Patent: Aug. 2, 2005

(54) GATHERING INFORMATION FROM SHORT-RANGE WIRELESS PORTALS

(75) Inventors: James Thomas Edward McDonnell, Bristol (GB); John Deryk Waters, Bath (GB); Lawrence Wilcock, Wiltshire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 792 days.

(21) Appl. No.: 09/821,146

(22) Filed: Mar. 29, 2001

(65) Prior Publication Data

US 2003/0208522 A1 Nov. 6, 2003

(30) Foreign Application Priority Data

Apr. 1, 2000 (GB) .............................................. 0007940

(51) Int. Cl.[7] .................................................. H04B 5/00
(52) U.S. Cl. ................ 455/41.2; 455/412.1; 455/414.2; 455/456.3; 455/552.1
(58) Field of Search .......................... 455/412.1, 412.2, 455/414.2, 456.3, 456.6, 456.1, 67.11, 41.2, 41.3, 552.1, 553.1, 426.1; 709/202, 203

(56) References Cited

U.S. PATENT DOCUMENTS 6,115,611 A 9/2000 Kimoto et al.
6,549,625 B1 * 4/2003 Rautila et al. .............. 380/258

FOREIGN PATENT DOCUMENTS

| EP | 0 948 222 A2 | 10/1999 |
|----|--------------|---------|
| WO | WO 98/56506 | 12/1998 |
| WO | WO 99/07125 | 2/1999 |
| WO | WO 99/29126 | 6/1999 |
| WO | WO 99/55102 | 10/1999 |
| WO | WO 00/07121 | 2/2000 |
| WO | WO 00/29979 | 5/2000 |

OTHER PUBLICATIONS

European Search Report dated Apr. 3, 2003, in corresponding to EP 01302192.
Patent Abstract of Japan, Vil. 1998, No. 05, Apr. 30, 1998 & JP 10 013961, Jan. 16, 1998.

* cited by examiner

*Primary Examiner*—Lee Nguyen

(57) ABSTRACT

Businesses may offer their services not only through internet websites but also by short-range wireless portals (51A,B,C) intended to catch passers-by; indeed, this latter means of business promotion may be used instead of an internet site. A method is provided of gathering information from such portals (51A,B,C) for use in a database service system 40. More particularly, a mobile device (20) provided with a short-range wireless receiver (21) is moved within range of such a portal and collects information about the services available from the local entity operating the portal. The device (20) then uses a cellular radio network (10) to send this information, together with location data about the portal, to a remote database service system (40) holding similar information from other portals. The user of the mobile device can be credited with a reward by the database service system for collecting such information.

18 Claims, 2 Drawing Sheets

GATHERING INFORMATION FROM SHORT-RANGE WIRELESS PORTALS

FIELD OF THE INVENTION

The present invention relates to the gathering of information from short-range wireless (including IR) portals.

BACKGROUND OF THE INVENTION

Databases linking specific service types to location are of proven value whether of manually-searchable paper form or computerised and electronically searchable. A typical use might be to locate a plumber in a particular location for providing emergency repair services; another example is to find shops in a certain area that sell sports goods.

The compilation and upkeep of such databases requires substantial effort if effected by individual enquiry to local service providers (generally, but not exclusively, local businesses). The advent of the internet and the proliferation of commercial websites has meant that much information about available services is accessible if only one knew where to look. To deal with this situation, programs generally referred to as "crawlers" have been evolved for automatically searching the web to find and classify new web sites. This classification can be done by looking for key words in the text of the web pages of the site or on the basis of meta information contained in meta tags embedded in the web pages. Operating in this way, the web crawlers can build up large databases that are searchable for particular words or phrases; as a result, these databases can be used to link location and services offered by businesses at those locations (for example, to find a plumber in Bristol, UK, the words "Bristol" and "plumber" can be input as search terms with the search being restricted to domain names in the "co.uk" domain. Whilst to date this linking has been generally rather haphazard, as more structured techniques are adopted for identifying information within web pages (in particular, the use of XML), substantial improvements can be expected in the ability of web crawlers to link location and various types of locally-available services. However, it will be appreciated that using a web crawler will only capture services offered by entities that have internet-accessible web sites which, of course, rules out many smaller businesses.

In the future, it can be expected that businesses will not only offer their services through internet websites, but will also use short-range communication means to provide information to passers-by carrying suitable mobile devices. A number of technologies exist for the short range communication of information to and between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

The information offered by businesses through these short range wireless (including IR) portals will generally correspond to that available on the website of the business provided such a website exists. However, it is likely that short-range wireless portals, requiring no governmental licensing and capable of installation by the business owner himself, could proliferate and become a major source of local service information that is not to be found on the web.

It is an object of the present invention to facilitate the capture and use of such information.

SUMMARY OF THE INVENTION

According to one aspect of the present invention, there is provided a method of gathering information from short-range wireless portals, comprising the steps of:
(a) physically moving a mobile device within range of a short-range wireless portal;
(b) receiving information from the portal about services available from the local entity operating the portal;
(c) sending a message containing that information to a remote database service system holding similar information from other portals; and
(d) storing the information at the database service system.

According to another aspect of the present invention, there is provided a mobile device comprising:
 a short-range wireless receiver for receiving information from a short-range wireless portal about services available from the local entity operating the portal;
 means for forming a message containing that information together with location data about the location of the portal; and
 a cellular radio subsystem for sending the message to a remote database service system over a mobile radio infrastructure.

In the present context, the term "portal" is used simply to mean a point of access to information and services being offered by the entity operating the portal.

BRIEF DESCRIPTION OF THE DRAWINGS

A method and device, both embodying the present invention, for gathering information from short-range wireless portals, will now be described, byway of non-limiting example, with reference to the accompanying diagrammatic drawings, in which.

BEST MODE OF CARRYING OUT THE INVENTION

Figure 1:
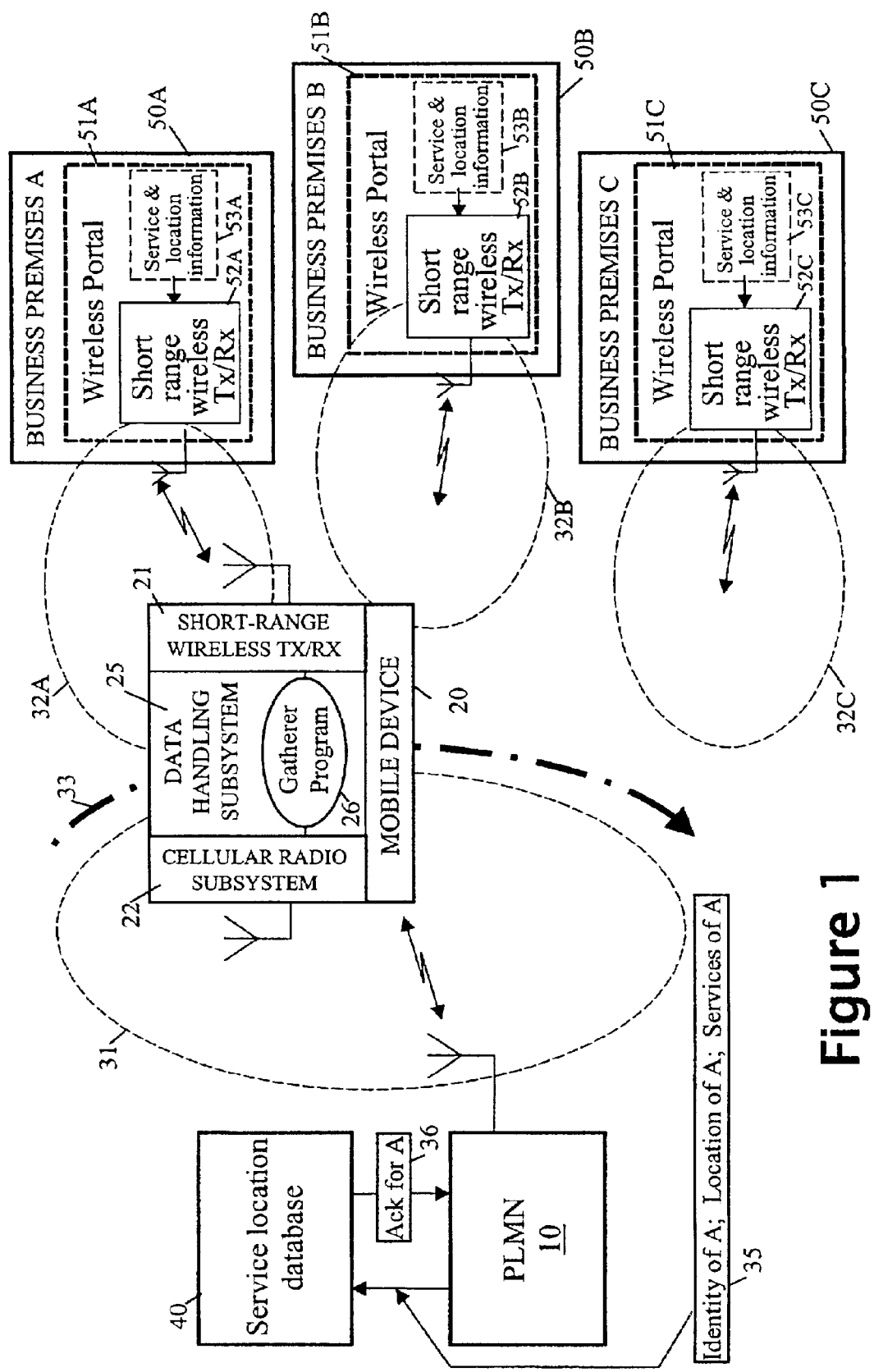
FIG. 1 is a diagram showing the gathering of information by a mobile device as it passes three short-range wireless portals, this information being passed back to a database system.

FIG. 1 depicts three adjacent business premises 50A, 50B and 50C of businesses A, B and C respectively. Each business premise 50A, 50B and 50C is equipped with a short-range wireless portal 51A, 51B, 51C comprising a short-range wireless transceiver 52A, 52B, 52C (for example, using a radio-based technology such as Bluetooth, or an infrared technology) by means of which passers-by can obtain information about the services available through the business concerned. This information can be text based or more graphically oriented, presenting pages such as those found on the web; the precise form in which information is presented will depend on the capabilities generally available in the target receiving devices. Where a business A, B, C also runs an internet website, then the web pages of that site are preferably also available through the short-range wireless portal run by the business.

Structured information 53A, 53B, 53C about the services offered by each business A, B, C and the location of each business is available through the corresponding portal 51A, 51B, 51C. This information will generally also include the name (or trading style) of the business and contact details such as a telephone number, e-mail address or website URL. The services can be electronic services available, for example, through the portal itself and/or other services offered by the business (such as retail services for particular types of goods, plumbing services, financial services, etc.). The structured information can be included in the pages normally accessible to passers-by (either explicitly or as meta data), or in special files.

A mobile device 20 carried by a user moving along path 33 is used to gather the structured information 53A, 53B, 53C from the business wireless portals when the device 20 comes within their respective coverage areas (indicated by dashed ellipses 32A, 32B, 32C in FIG. 1). As the device gathers the information, it transmits it to a service location database system 40 using a cellular radio infrastructure (Public Land Mobile Network, PLMN, 10); the coverage area for the local cell is depicted by dashed ellipse 31 in FIG. 1.

Device 20 comprises the following three main subsystems:

a short-range wireless transceiver subsystem 21 for communicating with the wireless portals 51A, 51B, 51C.

a cellular radio subsystem 22 for sending and receiving data over the PLMN 10 (as is well known to persons skilled in the art, PLMNs generally provide one or more data-capable bearer services by which mobile devices can send and receive data; data-capable bearer services can be provided, for example, by a Short Message Service, by using a voice traffic circuit for data, or by using specialised data facilities such as provided by GPRS for GSM networks (GPRS— General Packet Radio Service—enables IP (or X.25) packet data to be sent through the PLMN and full details of GPRS can be found in the ETSI, European Telecommunications Standards Institute, GSM 03.60 specification). Whilst the cellular radio subsystem will generally be provided in conjunction with voice phone functionality, this is not essential for the purposes of the present invention.

a data-handling subsystem 25 that interfaces with both the short-range wireless transceiver subsystem 21 and the cellular radio subsystem 22 via appropriate interfaces. The data-handling subsystem 25, when so instructed by the device user through a device user interface (not shown), runs a gatherer program 26 for gathering the structured information 53A, 53B, 53C from the portals 51A, 51B, 51C and sending it to the database system 40.

The data-handling subsystem 25 will generally be integrated with the other subsystems 21 and 22 into a single device; however, it would be possible to provide the subsystems in two or more separate physical elements appropriately linked together to operate as a single device.

Figure 2:
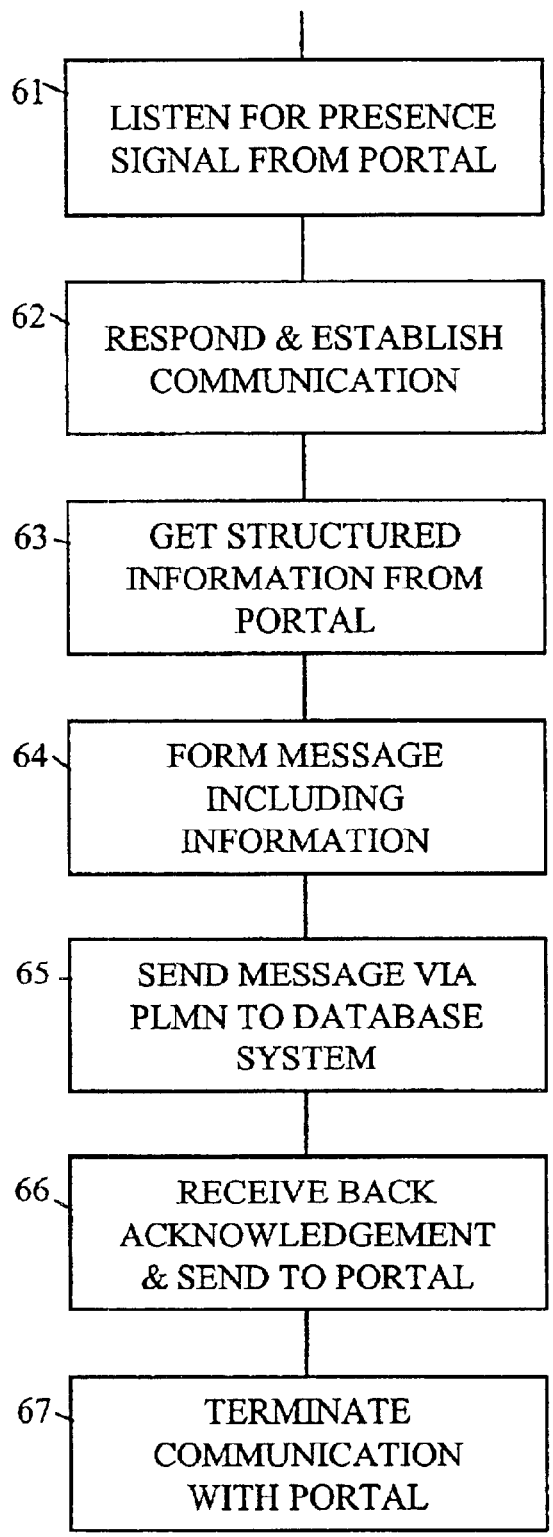
FIG. 2 is a diagram showing the main steps carried out by a gatherer program of the FIG. 1 mobile device.

The operation of the device 20 will now be described with reference to FIG. 2 that shows the main steps carried out by the gatherer program 26. With the gatherer program 26 activated, as user moves along path 33, the device first comes into the coverage zone 32A of portal 51A. The portal (and/or the device) will generally be arranged to regularly transmit presence (beacon) signals in order to alert nearby compatible systems of their presence. Device 20 picks up a beacon signal from portal 51 (step 61) and responds, setting up communication with the portal over the short-range wireless system (step 62). Device 20 then interrogates the portal 51A, requesting it for its structured information 53A which the portal returns (step 63). Program 26 next forms the structured information (identity of business A, location of portal, and services available from A) into a message 35 (step 64) that is addressed to the database system, this address being pre-stored in the device. The program now causes the cellular radio subsystem to send the message to the database service system 40 using a data-capable bearer service of PLMN 10 (step 65). The database system stores the structured information about business A and returns an acknowledgment which device 20 receives (step 66) and passes on to portal 51A. Portal 51A on receiving the acknowledgement, sets a flag in the structured information to indicate that the information is known to the database system. Finally, program 26 terminates communication (step 67).

The flag set in the structured information is used to indicate to interrogating devices similar to device 20 that the structured information associated with the portal has already been passed to the database system and does not need to be sent again. This flag is checked at step 63, steps 64 to 66 being skipped if the flag is in a set condition. The flag is reset in the structured information 53 each time that information is changed (for example, on the details of the business entity changing or upon a change in the services offered).

To avoid the device 20 unnecessarily communicating with portal 51A again as might occur if the device remains in the coverage area 32A of the portal, the device temporarily stores the identities of the portals recently visited and is arranged not respond to any portal whose beacon signal carries an identity already known to the device.

As the user who is carrying device 20 moves along path 33 (for example, through a business district), the device comes within range of new short-range wireless portals—in the illustrated example, portals 51B and 51C. The device 20 operates in the manner already described with reference to portal 51A to gather the structured information 53B and 53C associated with each portal and send it to the database system thereby automatically building up the service location database.

Whilst it would be possible for the device 20 to be carried by an agent of the database service system who is paid directly to carry and use the device 20, it will generally be more cost effective to gather information using the devices of ordinary device users by arranging for users who agree to participate in information gathering (generally on an ad hoc basis) to be rewarded for each successful entry in the database service system. This would, of course, require the identity of the device (or its user) to be included in every message 35 sent by the device to the database system 40. The reward given could, for example, take the form of a discount off the user's mobile phone bill for use of PLMN 10 (this would require either the operator of the PLMN 10 to be the same as the operator of the database system 40 or for there to be an appropriate agreement between them).

As will be appreciated by persons skilled in the art, many variants are possible to the above-described embodiment. For example, the location of a portal need not form part of the information provided by the portal, but instead, this location data could be provided by the device 20 as its own location since the device is located in close proximity to the portal; the device can discover its own location in any one of several well known ways, including by an in-built GPS system, from local location beacons, by measurements of the cellular radio signals from multiple base station transceivers of PLMN 10, and by a location request sent to a location server of PLMN 10 (the location server obtaining the device location by measurements made by the network). As an alternative to the device obtaining its location from a network location server, the device could authorize the database service system 40 to obtain the location data directly from the location server.

Where the location of a portal is taken to be that of the device 20, it is useful to timestamp both the location data relating to the device at the time the data is generated, and the structured information at its time of transmission by the portal or receipt by device. This permits the database system to check to see if there is a significant difference between the time of occurrence of the two events, such a difference indicating that the device could have moved significantly between the events with the result that the location data may not be accurate; it is then up to the database system to decide whether or not to accept the data. Preferably, time-stamping of both events is done in the device 20 so as to avoid errors arising due to the use of different clocks for stamping the two events. Significant differences in the timestamps could arise if there is a delay in getting access over the PLMN 10 either with a location server or the database system itself (where the latter is responsible for accessing the location server).

It is possible that the database system is only interested in businesses within a certain area. In this case, either the device 20 or the database system itself could operate a filter to reject inputs relating to businesses which, according to the associated location data, are outside the area of interest.

Of course, information could also be collected from the portals and provided to a database, independently of the presence of any location data, though this will generally be less useful.

Rather than the information about business identity, contact details and services provided, being available in a structured manner in each portal, the information could simply be contained in normal text and graphics; in this case, it is up to analysis software in the device 20 or database system 40 to identify and extract the relevant information (alternatively, a body of the information from the portal could simply be stored by the database system to be searched against later).

Whilst in the described embodiment the structured information received by device 20 is sent immediately to the database system, it would be possible simply to collect information over a period from a number of portals and then upload it all at once to the database system, either via PLMN 10 or another network, such as the internet. This arrangement has the drawback that the database system cannot acknowledge successful receipt straight away so that generally no acknowledgement can be passed to the portal concerned; the flag mechanism for avoiding passing repeat data to the database system therefore cannot be implemented. However, repeat provision of information is less of an issue since each provision of information does not require a separate usage of the PLMN 10.

It is possible to arrange for the same device to provide the information gathered from a portal to several different database systems. However, since the information may be successfully received by some but not others of these systems, the flag mechanism if used by a portal would preferably be implemented for each database system. This requires each database system that sends an acknowledgement to include its identity in the acknowledgement so that the portal can set a corresponding flag. The portal need not know in advance to which database systems its information is going to be passed since it can be arranged to generate a new flag in response to receiving an acknowledgment from a new database system.

With respect to the identity of the business included in the information gathered from a portal, preferably this would be represented by a unique identity number that could be used to look up information in some other on line database. However, it is more likely that the business identity will be expressed as a business name.

The device could be configured to permit the user to view the information gathered before it is transmitted to the database system and even to permit the user to change, add or delete to the gathered information before transmission.

What is claimed is:

1. A method of gathering information from short-range wireless portals, comprising the steps of:
   (a) physically moving a mobile device within range of a short-range wireless portal;
   (b) receiving information from said portal about a service available through a local entity operating said portal;
   (c) sending a message containing said information to a remote database service system; and
   (d) storing said information in a database at said database service system.

2. A method according to claim 1, wherein said message also contains a location of said portal, said location being stored with said information in said database service system to permit location-based searching of said database service system for entities providing specified types of service.

3. A method according to claim 2, wherein said location of said portal is provided to said mobile device by said portal.

4. A method according to claim 2, wherein said location of said portal is determined by said mobile device at a time of contact with said portal.

5. A method according to claim 1, wherein said message is passed from said mobile device to said database service system over a mobile cellular radio infrastructure.

6. A method according to claim 5, wherein upon receipt of said message, said database service system obtains a location of said mobile device from a location server of said mobile radio infrastructure, and stores said information in said database service system to permit location-based searching of said database service system for entities providing specified types of service.

7. A method according to claim 1,
   wherein said information is stored in said mobile device, and
   wherein said method further comprises sending said message containing said information to said database service system at a later time.

8. The method of claim 7, wherein said sending of said information at said later time is performed by way of a technique selected from the group consisting of email over the Internet, a web-based form over the Internet, and combinations thereof.

9. A method according to claim 1,
   wherein said database service system acknowledges receipt of said message by transmitting an acknowledgement back to said portal, where an indicator is set,
   wherein said indicator, when set, is interpreted for preventing further messages from being sent to at least said database service system by said mobile device or similar mobile devices that subsequently obtain information from said portal.

10. A method according to claim 9, wherein said indicator is reset by said local entity operating said portal when there is a change in information available from said portal.

11. A method according to claim 9,
   wherein said database service system has an associated identifier that is stored with said indicator and,
   wherein said preventing is restricted to preventing messages being sent to said database service system as identified by said associated identifier.

12. A method according to claim 1, wherein said storing said information results in a user of said mobile device being recorded a reward.

13. A method according to claim 1, wherein said information includes a name or trading style of said local entity and contact information.

14. The method of claim 13, wherein said contact information comprises a type selected from the group consisting of a telephone number, an email address, a website URL, and combinations thereof.

15. A mobile device comprising:
- a short-range wireless receiver for receiving information from a short-range wireless portal about a service available through a local entity operating said portal;
- a data handling subsystem for forming a message containing said information together with location data about a location of said portal; and
- a cellular radio subsystem for sending said message to a remote database service system over a mobile radio infrastructure for storage in a database.

16. A mobile device according to claim 15, further comprising an arrangement for receiving an acknowledgement back from said database service system and for passing said acknowledgment to the portal.

17. A method of gathering information from short-range wireless portals, comprising the steps of:
  (a) physically moving a mobile device within range of a short-range wireless portal;
  (b) receiving information from said portal about services available through a local entity operating said portal;
  (c) sending a message containing said information to a remote database service system; and
  (d) storing said information at said database service system, wherein steps (a) to (d) are repeated, using said mobile device or different mobile devices, for a plurality of short-range wireless portals, each of which provide respective information, wherein said respective information is sent to said database service system to build up at said database service system a database about services available through local entities operating said plurality of short-range wireless portals.

18. An apparatus comprising:

a database service system connected to a communications system that includes a mobile radio infrastructure; and a mobile device comprising:
- a short-range wireless receiver for receiving information from a short-range wireless portal about services available through a local entity operating said portal;
- a data handling subsystem for forming a message containing said information together with location data about a location of said portal; and
- a cellular radio subsystem for sending said message to said database service system over said mobile radio infrastructure;

wherein said database service system receives a plurality of messages containing information about a plurality of wireless portals, and uses said plurality of messages to build up a location-related database about services available through local entities operating said plurality of wireless portals.

* * * * *